US008097296B2

(12) United States Patent
Vincent et al.

(10) Patent No.: US 8,097,296 B2
(45) Date of Patent: Jan. 17, 2012

(54) METHOD FOR RETARDING THE SETTING OF MORTAR AND CONCRETE SURFACES

(75) Inventors: Dany Vincent, Chateaurenaud (FR); Philippe Antoine, Le Prieuré (FR)

(73) Assignee: W.R. Grace & Co.-Conn., Columbia, MD (US)

( * ) Notice: Subject to any disclaimer, the term of this patent is extended or adjusted under 35 U.S.C. 154(b) by 455 days.

(21) Appl. No.: 12/307,502

(22) PCT Filed: Jul. 2, 2007

(86) PCT No.: PCT/EP2007/005843
§ 371 (c)(1),
(2), (4) Date: Feb. 10, 2009

(87) PCT Pub. No.: WO2008/003448
PCT Pub. Date: Jan. 10, 2008

(65) Prior Publication Data
US 2009/0297702 A1    Dec. 3, 2009

(30) Foreign Application Priority Data
Jul. 6, 2006 (EP) .................................... 06014052

(51) Int. Cl.
C08L 91/00 (2006.01)
C08L 89/00 (2006.01)
B28B 7/38 (2006.01)
B05C 1/16 (2006.01)
B65B 33/00 (2006.01)
C09D 5/00 (2006.01)

(52) U.S. Cl. ..... 427/154; 427/133; 427/136; 106/38.24; 106/148.1

(58) Field of Classification Search .................. 106/38.2, 106/38.22, 38.23, 38.24, 148.1; 427/133, 427/134, 135, 136, 398.1, 422
See application file for complete search history.

(56) References Cited

U.S. PATENT DOCUMENTS
2,952,062 A    9/1960 Tillman
(Continued)

FOREIGN PATENT DOCUMENTS
CA    1133020 A1    10/1982
(Continued)

OTHER PUBLICATIONS
Written Opinion of the International Searching Authority for International Patent Application No. PCT/EP2007/005843, Form PCT/ISA/237, 7 pages.
(Continued)

*Primary Examiner* — Frederick Parker
*Assistant Examiner* — Michael Wieczorek
(74) *Attorney, Agent, or Firm* — Craig K. Leon; Stephan P. Williams

(57) ABSTRACT

An exemplary method for set retarding the surface of a mortar or concrete material, comprising applying to the surface of a mortar or concrete, or to the inner surface of a mold for forming the mortar or concrete, a hot melt coating composition which is heated to assume a flowable or sprayable form, and allowing the hot melt coating composition to cool to ambient temperature whereby the composition forms a solidified membrane, and thereafter removing the membrane. Preferably, the hot melt coating composition contains at least one agent operative to retard the setting of the mortar or concrete, and optional finely divided particulate materials, light-reflective pigments, or mixtures thereof.

12 Claims, 2 Drawing Sheets

Left Side ("Classic Curing"): PRIOR ART solvent-based coating
Right Side ("Hot Melt Curing"): Hot Melt Coating of the Invention

U.S. PATENT DOCUMENTS

| | | | |
|---|---|---|---|
| 4,134,956 A | | 1/1979 | Suzuki et al. |
| 4,150,192 A | * | 4/1979 | Downey .................. 428/462 |
| 4,205,040 A | | 5/1980 | Aoyama et al. |
| 4,748,788 A | | 6/1988 | Shaw et al. |
| 5,236,975 A | | 8/1993 | Sekine |
| 5,389,172 A | | 2/1995 | Kobayashi et al. |
| 5,447,563 A | * | 9/1995 | van Hoorn ............... 106/38.22 |
| 5,496,615 A | | 3/1996 | Bartlett et al. |
| 5,501,277 A | * | 3/1996 | Onan et al. .................. 166/293 |
| 5,932,344 A | * | 8/1999 | Ikemoto et al. ............. 428/343 |
| 6,187,382 B1 | | 2/2001 | Lightcap, Jr. |
| 6,201,053 B1 | * | 3/2001 | Dieckmann et al. .......... 524/301 |
| 6,730,764 B1 | | 5/2004 | Ikuta et al. |
| 6,811,810 B2 | * | 11/2004 | LaFay et al. ................. 427/133 |
| 7,037,367 B2 | * | 5/2006 | Mauchamp et al. ....... 106/148.1 |

FOREIGN PATENT DOCUMENTS

| | | |
|---|---|---|
| EP | 0974562 A1 | 1/2000 |
| JP | 11292594 A | 10/1999 |
| WO | 85/05066 A1 | 11/1985 |

OTHER PUBLICATIONS

International Preliminary Report on Patentability for International Patent Application No. PCT/EP2007/005843, Form PCT/IPEA/409, 9 pages.

International Search Report for International Patent Application No. PCT/EP2007/005843, Form PCT/ISA/210, 4 pages.

* cited by examiner

Left Side ("Classic Curing"): PRIOR ART solvent-based coating

Right Side ("Hot Melt Curing"): Hot Melt Coating of the Invention

Left Side: PRIOR ART solvent-based coating after exposure to high pressure water jet Right Side: Exemplary Hot Melt Coating Composition of Invention after exposure to high pressure water jet

METHOD FOR RETARDING THE SETTING OF MORTAR AND CONCRETE SURFACES

This is a Section 371 application based on International Application No. PCT/EP2007/005843 filed Jul. 2, 2007, which claims priority to EP06014052.2 filed Jul. 6, 2006.

FIELD OF THE INVENTION

The present invention relates to surface retarding of hydratable cementitious materials, and more particularly to a method comprising applying a non-petroleum-based hot melt coating composition to the surface of a mortar or concrete, and subsequently allowing the hot melt coating composition to harden to form a membrane, and thereafter removing the membrane. Alternatively, the hot melt coating composition can be applied to the inner surface of a form for molding the mortar or concrete, and, after the mortar or concrete is hardened, the hot melt coating composition is removed.

BACKGROUND OF THE INVENTION

It is known to apply a coating compound onto fresh poured concrete to minimize evaporation of moisture from the surface, and thereby to avoid or to minimize the occurrence of shrinkage cracking in the concrete. Such coating compounds typically comprise the use of a resin or wax dispersed in a water-based or petroleum oil-based carrier. The coatings are typically sprayed onto fresh concrete, and left in place for several days or weeks, such that a coherent membrane is formed after evaporation of the water or solvent from the sprayed coating. If paint or a bituminous layer is applied afterwards, the coating must be completely removed to avoid defeating the adhesion of ensuing coating materials. The coating can be removed by sandblasting or by scarification. The removal step can therefore be expensive and time-consuming. For example, sandblasting is labor-intensive because it is important to remove all resins or wax residues to expose the concrete surface or otherwise subsequent coatings or paints will not properly adhere to the concrete.

In addition to coating concrete surfaces to retard its setting, it is also known to apply coating materials to the inner surfaces of a form for molding the concrete. For example, U.S. Pat. No. 5,236,975 of Sekine disclosed the use of a coating material for preventing the setting of the surfaces of cement mortar that maintain contact with the coating material. The coating material taught by Sekine is a powdered polymer, having a high water absorption characteristic, which is made from mixing propylene glycol with maleic anhydride and either phthalic anhydride or isophthalic acid. The coating material can be removed by water washing, and decorative materials or patterns can be applied subsequently to the exposed surface of the concrete.

U.S. Pat. No. 5,389,172 of Kobayashi et al. disclosed a finishing method for exposing aggregate in concrete which is purportedly capable of reducing the usage of decorate aggregate and avoiding long working times. The method included the steps of loading aggregates onto an adhesive sheet, burying part of the aggregates in an adhesive layer of the adhesive sheet; casting mortar or concrete onto an aggregate loading surface of the aggregate loading adhesive sheet, hardening the mortar or concrete, and removing the adhesive sheet.

U.S. Pat. No. 4,205,040 of Aoyama et al. disclosed an exposed aggregate finishing method for concrete which comprises the following steps according to the abstract of the invention: coating the inside faces of a form for concrete with a cement setting retarder, drying, coating the dried faces with a synthetic organic polymer coating material which is soluble in an aqueous alkaline solution of cement but is insoluble in water, and drying the coated faces. Alternatively, the method could be carried out by coating the inside faces of the form for concrete with a mixture of the cement setting retarder and the organic polymer coating material and drying the coated faces. Concrete is thereafter placed in the concrete form, the form removed, and the surface of the molded concrete washed to make the surface rough.

As noted in Aoyama, the coating composition can include a surface retarder for treating the surface of concrete compositions. Fresh concrete containing aggregates is poured and leveled, and then the surface retarder is sprayed onto the surface at a rate of approximately 200 g/m$^2$. After a number of hours, the treated surface is washed off with a jet of water under high pressure to remove uncured cement and to expose the aggregates on the surface.

Conventional surface retarders are typically water-based or solvent-based. The retarding agent "actives" (e.g., sucrose, organic acids or their salts, etc.) are either dissolved in water or suspended in a solvent. Solvent-based retarders are derived from petroleum distillates, and are typically less sensitive to the effects of rain and sun, but are not favored from an environmentalist's viewpoint. Water-based surface retarders, while environmentally friendly, suffer in terms of performance when exposed to high heat or sunlight, because they are susceptible to evaporation.

More recently, U.S. Pat. No. 7,037,367 of Mauchamp et al. disclosed the use of vegetable or mineral oil-based surface retarders. One advantage of using such vegetable or mineral oil-based set retarders was that they could provide a wet film coating, which, in turn, provided the retarder actives a favorable opportunity to penetrate into the surface of the mortar or concrete. Maintaining this penetrating ability facilitated the ability of the surface retarder to etch the treated surface of the mortar or concrete.

It is an objective of the present invention to provide a novel method, for applying coating materials to mortars and concretes, which avoids the use of resins or waxes dissolved in solvent, thereby avoiding VOC emissions and the need for sandblasting to remove the coating.

It is also an objective of the present invention to provide a method for applying coating compounds which avoids the use of resins or waxes in water, thereby achieving high performance in terms of minimizing or avoiding evaporation of moisture from the mortar or concrete. The methods of the invention also achieve superior performance, in terms of minimizing moisture evaporation from the mortar or concrete, without resorting to the use of plastic sheets, which can create waste disposal problems.

SUMMARY OF THE INVENTION

The present invention provides a novel method for set retarding the surface of a mortar or concrete material as defined in the claims. An exemplary method comprises applying to the surface of a mortar or concrete, or to the inner surface of a mold for forming the mortar or concrete, a hot melt coating composition which is heated to assume a flowable or sprayable form, and allowing the hot melt coating composition to cool to ambient temperature whereby the hot melt coating composition forms a solidified membrane after the mortar or concrete has been in contact with the hot melt coating composition cooled by ambient temperature, and thereafter removing the solidified hot melt coating composition membrane from the mortar or concrete.

The mortar or concrete can remain covered by the membrane for up to two weeks or more, particularly if the hot melt coating composition contains one or more optional set retarder additives, and thereafter the membrane formed by the cooling of the hot melt coating composition can be removed conveniently, such as by using a stream of water under pressure, without the need for sandblasting.

If the hot melt coating composition, which optionally contains one or more set retarder additives, is used for coating the inner surfaces of a metal or wooden form, the mortar or concrete can then be cast into the coated mold preferably after the coating has cooled to ambient temperature and solidified into a membrane. Once the mortar or concrete has been demolded from the form, the membrane can be removed rather easily from the mold and/or mortar or concrete by using pressurized water, without the need for sandblasting.

It is contemplated that conventional set retarder components or ingredients, which hereinafter may be referred to more simply as "actives," can be successfully used, individually or in combination with other actives (and optional components such as pigments, fillers, etc.), in the hot melt compositions and methods of the invention.

It is also contemplated that many vegetable or animal oil mediums as disclosed in U.S. Pat. No. 7,037,367 of Mauchamp et al. can be employed in the methods of the invention, thereby avoiding the use of solvents or other environmentally unsound materials.

Other features and advantages of the invention are described in further detail hereinafter.

DETAILED DESCRIPTION OF EXEMPLARY EMBODIMENTS

Figure 1:
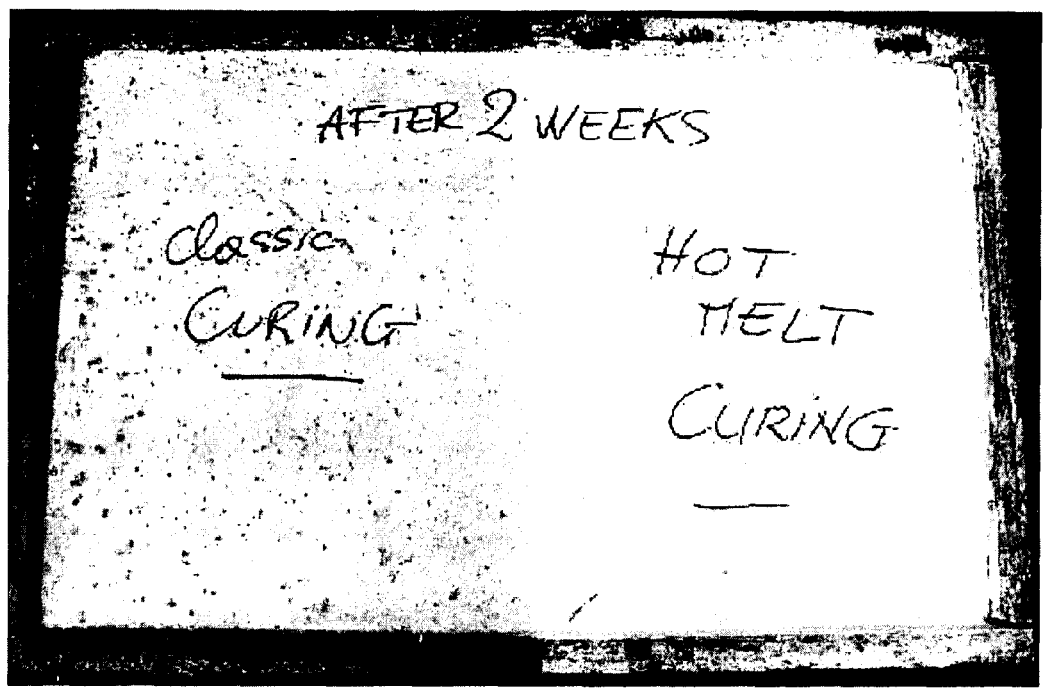
FIG. 1 is a photograph of a concrete surface on which a PRIOR ART solvent-based surface retarding resin coating composition has been applied (on the left side) and on which an exemplary hot melt coating composition has been applied (on the right side)

As used herein, the terms "cement" and "cementitious composition" (which are synonomous with "cement composition") are understood to refer to pastes, mortars, and concrete compositions comprising a hydratable cement binder. The terms "paste", "mortar" and "concrete" are terms of art: "pastes" are mixtures composed of a hydratable cement binder (usually, but not exclusively, Portland cement, masonry cement, or mortar cement, and this binder may also include limestone, hydrated lime, fly ash, granulated blast furnace slag, pozzolans, and silica fume or other materials commonly included in such cements) and water; "mortars" are pastes additionally including fine aggregate (e.g., sand), and "concretes" are mortars additionally including coarse aggregate (e.g., crushed gravel, stone). The cementitious compositions tested in this invention may be formed by mixing required amounts of certain materials, e.g., a hydratable cement, water, and fine and/or coarse aggregate, as may be applicable to make the particular cement composition being formed.

The term "fresh" mortar or concrete is understood by those of ordinary skill to refer to hydratable cementitious compositions wherein water has been combined with cementitious binder to initiate the hydration reaction leading to the hardening of the material.

Exemplary hot melt coating compositions which can be applied onto the surface of a fresh mortar or concrete, or alternatively onto the inner surfaces of a form for molding the mortar or concrete, may include those which are conventionally known. For example, the hot melt coating compositions may comprise one or more materials selected from a vegetable oil, animal oil, or derivatives or mixtures thereof, as taught in U.S. Pat. No. 7,037,367 of Mauchamp et al., and these coating compounds may optionally, and preferably, contain one or more set retarders for retarding the surface of the mortar or concrete.

As noted by Mauchamp et al., a list of suitable vegetable oils and derivatives was provided in World Patent Application No. WO 85/05066 (International Publication No.) of Nielsen et al., International Patent Application No. PCT/CK8500043, beginning at page 16. The derivatives include: hexyl acetate, 2-ethylhexyl acetate, octyl acetate, isooctyl acetate, cetyl acetate, dodecyl acetate, tridecyl acetate; butyl butyrate, isobutyl butyrate, amyl isobutyrate, hexyl butyrate, heptyl butyrate, isoheptyl butyrate, octyl butyrate, isooctyl butyrate, 2-ethylhexyl butyrate, nonyl butyrate, isononyl butyrate, cetyl butyrate, isocetyl butyrate; ethyl hexanoate, propyl hexanoate, isopropyl hexanoate, butyl hexanoate, isobutyl hexanoate, amyl hexanoate, hexyl hexanoate, heptyl hexanoate, isoheptyl hexanoate, octyl hexanoate, 2-ethylhexyl hexanoate, nonyl hexanoate, isonynyl hexanoate, cetyl hexanoate, isocetyl hexanoate; methyl octanoate, ethyl octanoate, propyl octanoate, isopropyl octanoate, butyl octanoate, isobutyl octanoate, amyl octanoate, hexyl octanoate, heptyl octanoate, isoheptyl octanoate, octyl octanoate, isooctyl octanoate, 2-ethylhexyl octanoate, nonyl octanoate, isononyl octanoate, cetyl octanoate, isocetyl octanoate; methyl 2-ethylhexanoate, ethyl 2-ethylhexanoate, propyl 2-ethylhexanoate, isopropyl 2-ethylhexanoate, butyl 2-ethylhexanoate, isobutyl 2-ethylhexanoate, isoamyl 2-ethylhexanoate, hexyl 2-ethylhexanoate, heptyl 2-ethylhexanoate, isoheptyl 2-ethylhexanoate, octyl 2-ethylhexanoate, isooctyl 2-ethylhexanoate, 2-ethylhexyl 2-ethylhexanoate, nonyl 2-ethylhexanoate, isononyl 2-ethylhexanoate, cetyl 2-ethylhexanoate, isocetyl 2-ethylhexanoate; methyl decanoate, ethyl decanoate, propyl decanoate, isopropyl decanoate, butyl decanoate, isobutyl decanoate, isoamyl decanoate, hexyl decanoate, heptyl decanoate, isoheptyl decanoate, octyl decanoate, isooctyl decanoate, 2-ethylhexyl decanoate, nonyl decanoate, isononyl decanoate, cetyl decanoate, isocetyl decanoate; methyl laurate, ethyl laurate, propyl laurate, isopropyl laurate, butyl laurate, isobutyl laurate, isoamyl laurate, hexyl laurate, heptyl laurate, isoheptyl laurate, octyl laurate, isooctyl laurate, 2-ethylhexyl laurate, nonyl laurate, isononyl laurate, cetyl laurate, isocetyl laurate; ethyl oleate, propyl oleate, isopropyl oleate, butyl oleate, isobutyl oleate, isoamyl oleate, hexyl oleate, heptyl oleate, isoheptyl oleate, octyl oleate, isooctyl oleate, 2-ethylhexyl oleate, nonyl oleate, isononyl oleate, cetyl oleate, isocetyl oleate; diethyl succinate, dipropyl succinate, diisopropyl succinate, dibutyl succinate, diisobutyl succinate, diisoamyl succinate, dihexyl succinate, diheptyl succinate, diisoheptyl succinate, dioctyl succinate, diisooctyl succinate, di-2-ethylhexyl succinate, dinonyl succinate, diisononyl succinate, dicetyl succinate, diisocetyl succinate; dimethyl adipate, diethyl adipate, dipropyl adipate, diisopropyl adipate, dibutyl adipate, diisobutyl adipate, diisoamyl adipate, dihexyl adipate, diheptyl adipate, diisoheptyl adipate, dioctyl adipate, diisooctyl adipate, di-2-ethylhexyl adipate, dinonyl adipate, diisononyl adipate, dicetyl adipate, diisocetyl adipate; isopropyl myristate, isobutyl myristate, butyl myristate, amyl myristate, hexyl myristate, heptyl myristate, isoheptyl myristate, octyl myristate, 2-ethylhexyl myristate, nonyl myristate, isononyl myristate, cetyl myristate, isocetyl myristate; isopropyl palmitate, isobutyl palmitate, butyl palmitate, amyl palmitate, hexyl palmitate, heptyl palmitate, isoheptyl palmitate, octyl palmitate, 2-ethylhexyl palmitate, nonyl palmitate, isononyl palmitate, cetyl palmitate, isocetyl palmitate; isopropyl stearate, isobutyl stearate, butyl stearate, amyl stearate, hexyl stearate, heptyl stearate, isoheptyl stearate, octyl stearate, 2-ethylhexyl stearate, nonyl stearate, isononyl stearate, cetyl stearate, and isocetyl stearate.

Preferred vegetable oil derivatives include myristyl myristate, hydrogenated coconut oil, and vegetable triglycerides. Vegetable oils and vegetable oil derivatives are believed to be especially helpful in modifying the melting point of the hot melt coating compositions of the invention or, as another example, in modifying the crystallization characteristic of the hot melt coating composition as it is cooled to ambient temperature after hot-spray application onto a surface.

Vegetable oils useful in the invention may be essential oils. The term "essential" means and refers to oils that contain the characteristic odor or flavor (i.e., the essence) of the original flower or fruit. An essential oil is usually obtained by steam distillation of the flowers or leaves or cold pressing of the skin or other parts (e.g., stem, flower, twigs, etc.). Exemplary essential oils include orange, grapefruit, lemon, citrus, and pinetree. For purposes of the present invention, however, such essential oils will probably need to be combined with other vegetable oils and derivatives such as the aforementioned myristyl myristate, hydrogenated coconut oil, and vegetable triglycerides, such that the melting point is in the 35-55 degree Celsius range and thus above usual ambient temperatures, so that the when heated above 35-40 degrees C., the mixture can be spray-applied in liquid form. Thus, essential oils are not critical to the invention, but they can be used for modifying properties of the hot melt coating composition, such as melt viscosity.

Exemplary vegetable oil derivatives useful in the present invention, such as for dispersing the optional set retarder additive, may be selected from the group of mono and diglycerides of $C_6$-$C_{30}$ fatty acids, esters of $C_6$-$C_{30}$ fatty acids, ethoxylated compounds of $C_6$-$C_{30}$ fatty acids, $C_6$-$C_{30}$ fatty alcohols, $C_6$-$C_{30}$ fatty amines, $C_6$-$C_{30}$ fatty amides, and tall oil derivatives. It is believed that the higher number of carbons will correspond with a higher melting point, such that the preferred melting point range of 35-55 degrees C. can be targeted when formulating the hot melt composition for forming the membrane on the mortar and concrete (or inner surface of the concrete form) when allowed to cool to ambient temperature.

Exemplary "animal oils" suitable for use in the invention include animal substance, such as bone or other body components. Examples include lard oil, bone oil, herring oil, cod liver oil, neatsfoot oil, sardine oil, lanoline oil, fish oil, sheep wool oil, tallow oil, and bees wax. Derivatives of animal oils preferably include mono and diglycerides of $C_6$-$C_{30}$ fatty acids, esters of $C_6$-$C_{30}$ fatty acids, ethoxylated compounds of $C_6$-$C_{30}$ fatty acids, $C_6$-$C_{30}$ fatty alcohols, $C_6$-$C_{30}$ fatty amines, $C_6$-$C_{30}$ fatty amides, and tall oil derivatives. (See also list provided above in discussion of vegetable oil derivatives).

Thus, vegetable oils, animal oils, and derivatives and mixtures thereof, optionally incorporating surface retarders, should be selected to provide a hot melt coating material that can be spray applied onto the surface of a mortar or concrete at a heated temperature, and, when allowed to cool to ambient temperatures, forms a solid membrane to minimize or to prevent evaporation of moisture from the mortar or concrete.

The present inventors believe that biodegradable and even edible materials, such as butter, peanut butter, cocoa butter, could be incorporated into hot melt coating compounds for the purposes contemplated herein. (Although one would not likely select these materials if the result was that animals, birds, or insects would be tempted to eat the membrane and defeat its purpose).

A pressurized jet of water can be used to remove the solidified film. Alternatively, the curing compound can be spray applied at a heated temperature onto the inner surfaces of a mold for forming the mortar or concrete into a structure, and the compound allowed to cool and solidify at ambient temperature into a solid film before (or during) pouring of the fresh mortar or concrete into the mold. After the mortar or concrete is removed from the mold, the solidified curing compound film can be removed from the mortar, concrete, and/or mold using a pressurized stream of water.

High pressure washers, such that type used by home owners to clean houses or walkways, or to clean automobiles, can be used for purposes of removing, from the mortar, cement, or form, the solidified membrane formed from the applied hot melt composition. The water jet pressure may vary from 50 to 200 kg per square meter, and is ideally about 150 kg/m$^2$.

Preferably, the amount of vegetable oil, animal oil, and/or derivative thereof is 1-98% by total weight of the composition, more preferably 25-92% by total weight of the composition, and most preferably 50-90% by total weight of the composition.

Conventional surface retarding actives for retarding the setting of the mortar or concrete are contemplated for use in the present invention, and these may be used individually or in combination depending upon the preferences of the user. Exemplary set retarding actives may be used in the amount of 1.0% to 20.0% by total weight of the composition. Exemplary retarding actives include carboxylic acids (e.g., malic, tartaric, citric, gluconic, heptagluconic) and their salt form (e.g., sodium, potassium, calcium); or they may be sugars, such as sucrose, roferose, dextrose, maltose, lactose, xylose, fructose, mannose, or glucose.

A preferred set retarder composition of the invention comprises at least one active, such as citric acid or citrate, or a sugar such as sucrose, dispersed in melted greases or melted hydrogenated cocoanut oil. For example, these oils can be used in an amount of 50% or more by total weight of the composition.

As another example, at least one cement set retarding active can be dispersed in a melted animal oil or its derivative, which can be used instead of, or in combination with, a vegetable oil or its derivative. It is further contemplated that mixtures of animal oil and vegetable oil can be employed for various purposes. For example, a pinetree oil can be used to cover or mask the smell of sheep wool oil.

As another example, the set retarder actives may be dispersed within a continuous phase carrier comprising a melted vegetable oil as well as a vegetable oil derivative. The vegetable oil(s) and/or animal oil(s) function preferably as a continuous phase carrier within which to suspend one or more retarding actives (e.g., sugar(s), acids, and/or their salts) dispersed throughout as a discontinuous phase.

For environmental reasons, the present inventors prefer that no petroleum derivatives be employed in the coating compositions of the invention. The use of petroleum-based solvents and/or water in the hot melt coating compositions of the invention is optional. Usage of petroleum-derivatives in resins, waxes, paraffin materials, solvents, and other components of the hot melt coating compositions of the invention is therefore possible even if not preferable.

Further exemplary hot melt coating compounds of the invention which are used for coating fresh mortars or concretes, or for coating inner surfaces of molds for forming mortars or concretes, can optionally include finely divided particulate material as fillers. For example, the amount of such particulate materials can be between 1-60% and more preferably 10-50% based on total weight of the hot melt coating composition.

The term "finely divided particulate material" means and refers to granules, particles, powders, dust, or ground material. Such particulate material, for example, can include calcium carbonate, sand, silicate sand, cement, talc, titanium dioxide, carbon black, slate dust, granite dust, clay, iron oxides, cobalt oxide, zinc oxide, silicon dioxide, mica, clay (e.g., kaolin), barium sulfate, sodium silico-aluminate, alumina, barium carbonate, dolomite (which is a carbonate of calcium and magnesium, $CaMg(CO_3)_2$), magnesium carbonate, magnesium oxide, kieslguhr (diatomaceous earth), or mixtures of any of the foregoing. The total filler content may be, for example, 1-60% based on total weight of the hot melt coating composition. The size of the finely divided particulate materials can be selected depending on personal preference and the nature of spray equipment used.

Other exemplary finely divided particulates can include organic materials such as: wood flour, cereal flour, gums, corn starch, wheat starch, rice starch, pea starch, carrageenans, alginates, and mixtures thereof, in the amount of 1-60% based on total weight of the hot melt coating composition.

Still further exemplary finely divided particulates useful in the invention can include chemically modified derivatives of finely divided vegetable raw materials such as modified cellulose, gluten, hydroxyethyl cellulose, hydroxypropyl cellulose, carboxymethylcellulose, hydroxyethylcellulose, acetate modified starch, phosphate modified starch, hydroxypropyl modified starch, adipate modified starch, modified gums, and mixtures thereof.

Still further exemplary coating compositions of the invention may also include one or more pigments, colorants, or dyes, such as titanium dioxide, iron oxide, chromium oxide, zinc oxide, magnesium oxide, or other pigments or colorants, in an amount of 0-30% by total weight of the composition. It is desirable to employ at least one pigment, colorant, or dye (and preferably white pigments that are sunlight reflective, e.g., titanium dioxide) such that an applicator can visually confirm, such as during a spray application, that a particular targeted cementitious surface has been treated with the surface retarder composition.

Other exemplary coating compositions of the invention may additionally include other components, such as sorbitol, boric acid (or its salt), alkylphosphates, proteins, and casein. These further components may be used for affecting various properties of the coating compositions, such as rheology, viscosity, and/or surface tension. Accordingly, further embodiments include one or more rheology modifiers and/or viscosity modifiers.

Exemplary methods of the invention comprise applying a coating composition which has been heated so that it is applicable as a liquid, to the surface of a fresh mortar or concrete to form a coating layer, or alternatively to the inner surfaces of a form for molding fresh mortar or concrete, and allowing the coating to solidify at ambient temperature. The coating composition may be applied by roller or brush or other mechanical means, but is preferably spray-applied directly to the surface to be treated. After the fresh mortar or concrete is cured (and, in the latter case, after the fresh mortar or concrete is removed from the mold), the solidified coating layer may be washed away from the surface of the mortar or concrete (or from the mold) using a pressure-washer or hose to reveal a rough surface.

In a further exemplary method of the invention, the hot melt coating composition has a melting point of 35-50 degrees C. and is spray-applied onto the surface of the mortar or concrete or onto the inner surfaces of the mold at a temperature of 55-65 degrees C. Thereafter, the hot melt coating composition is allowed to cool to ambient temperature, which is below 35 degrees Celcius, whereby the hot melt coating composition (containing optional set retarder actives) forms a solidified membrane that can be removed by a pressurized stream of water.

The hot melt coating compositions should be applied in a wet thickness sufficient to cover the surface of the mortar, concrete, or form (e.g., 100-200 microns average thickness), and the coverage rate can be 50-400 grams per square meter and more preferably 100-200 grams per square meter.

In a further exemplary method of the invention, the hot melt coating composition, optionally containing one or more set retarder additives, has a melting point of 35-55 degrees C., and is spray-applied in liquid form onto the surface of the mortar or concrete or onto the inner surfaces of the mold at a temperature of 40-60 degrees C. to form a coherent membrane, allowed to cool to below melting point temperature (such as by exposure to ambient temperature), whereby the hot melt coating composition forms a solidified membrane. Removal of the membrane from the mortar or concrete or from the form can be done by pressured water jet.

While the invention is described herein using a limited number of embodiments, these specific embodiments are not intended to limit the scope of the invention as otherwise described and claimed herein. Modification and variations from the described embodiments exist. More specifically, the following examples are given as specific illustrations of embodiments of the claimed invention. It should be understood, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% ... 50%, 51%, 52%, ... 95%, 96%, 97%, 98%, 99%, or 100%. Moreover, any numerical range represented by any two values of R, as calculated above, is also specifically disclosed.

EXAMPLE 1

An exemplary hot melt coating composition, suitable for spray-application at heated temperature directly onto the surface of a fresh mortar or concrete, is made by combining the following components: hydrogenated coconut oil (90%), natural tartaric acid (8%), titanium dioxide (2%). The melting point of this composition was about 35 degrees Celcius. The tartaric acid and titanium dioxide were ground into the oil at 35 degrees C. This mixture was sprayed at a temperature of 60 degrees C. on a fresh concrete at a rate of 200 grams per square meter, to provide curing compound protection in accordance with French Standards (NF P 18-371). The coating composition was allowed to cool and solidify into a membrane at ambient temperature. After two weeks, it was possible to remove the coating membrane membrane using a high-pressure water jet, and a rough concrete surface was thus exposed.

EXAMPLE 2

Another exemplary hot melt coating composition, suitable for spray-application at heated temperature directly onto the surface of a fresh mortar or concrete, is made by combining the following components: coconut hydrogenated oil (72%), myristic myristate (18%), tri sodium citrate (8%), and titanium dioxide (2%). The melting point of this mixture was also around 35 degrees Celcius. The tri sodium citrate and titanium dioxide were ground into part of the hydrogenated coconut oil at 40 degrees Celcius. This mix was sprayed at 90 degrees Celcius on a fresh zero slump concrete to provide a good curing effect, and after solidifying into a membrane at ambient temperature was easily removed using a high pressure water jet. It is believed by the inventors that this hot melt coating composition would provide an excellent etching effect for concrete roads.

EXAMPLE 3

An exemplary hot melt coating composition, suitable for spray-application at heated temperature onto the inner surfaces of a mold for forming a fresh mortar or concrete into a structure, is made by combining the following components: myristyl myristate (45%), hydrogenated coconut oil (20%), titanium dioxide (5%), tri sodium citrate (12%), calcium carbonate (15%), and precipitated silica (3%). The melting point of this mixture is around 38-40 degrees Celcius. This mixture is spray-applied using an electric spray maintained at 55 degrees C. This provided a coating membrane that became hard immediately on a steel mold at +5 degrees C. and also at +3 degrees C. When removed from the mold, the concrete had an exposed aggregate surface with a medium etching (approximately 2 millimeters depth).

EXAMPLE 4

Another exemplary hot melt coating composition, suitable for spray-application at heated temperature onto the inner surfaces of a mold for forming a fresh mortar or concrete into a structure, is made by combining the following components: vegetable tri glycerides (melting point: 39-40 degrees C.) (41%), titanium dioxide (5%), tri sodium citrate (10%), sucrose (15%), calcium carbonate (15%), precipitated silica (3%), and iron oxide (1%). Applied with an electric spray maintained at 60 degrees C., this mixture provided a coating that solidified into a membrane on a wooden mould from +10 to +35 degrees C. The exposed aggregate surface was good with a strong etching (approximately 4 millimeters depth).

EXAMPLE 5

Hot melt coating compositions of the invention are believed to provide superior performance in comparison with prior art coating compositions, both in terms of minimizing or preventing evaporation of moisture from fresh mortar or fresh concrete surfaces and in terms of ease and convenience of removal. For example, FIG. 1 is a photograph of a concrete surface on which a PRIOR ART solvent-based surface retarding resin coating composition has been spray-applied (on the left side) and on which an exemplary hot melt coating composition of the invention (take from Example 1) has been spray-applied (on the right side). Both coating compositions contain a light-reflective pigment (titanium dioxide), and were applied in equal thicknesses (average coverage rate of 50-400 grams per square meter, or wet thicknesses of 50-400 microns). It was observed that the PRIOR ART coating (left side) was less uniform when compared to the exemplary hot melt coating composition of the invention (right side). Two weeks after application of both coatings, FIG. 1 shows a suggestion that certain portions of the PRIOR ART coating have thinned, perhaps due to evaporation of moisture through the PRIOR ART solvent-based coating (which the present inventors surmise is evidenced by the lack of strong white color on the left side coating), whereas the hot melt coating of the invention was solidified much more quickly upon cooling to ambient temperature, and therefore formed a strong barrier to prevent moisture from escaping and consequently disrupting the formation of the barrier, and this is evidenced in the strong white color on the right side of FIG. 1.).

Figure 2:
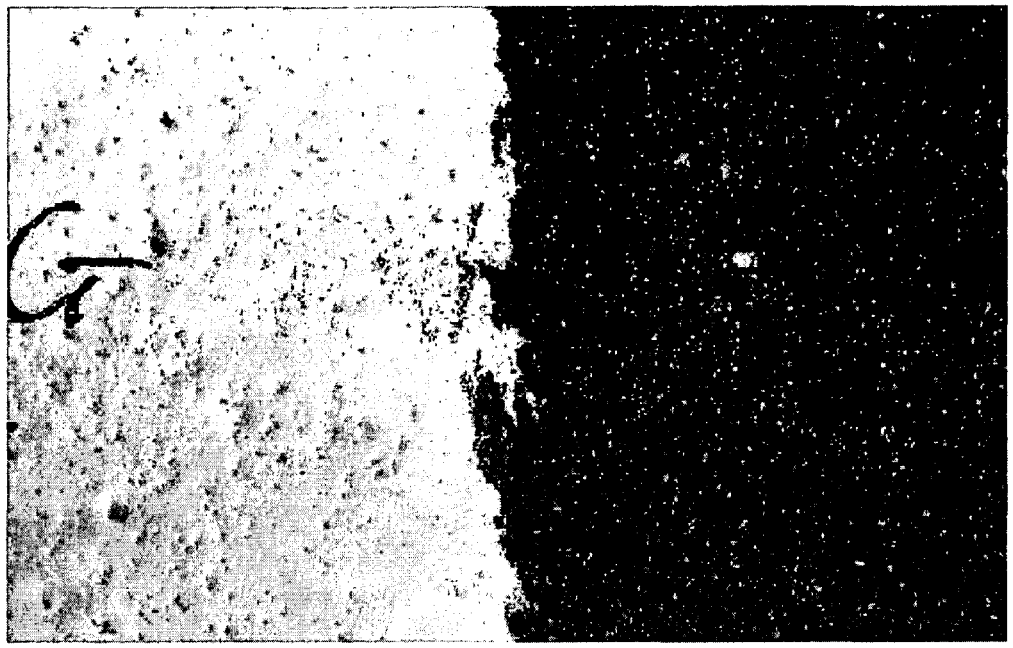
FIG. 2 is a photograph of the concrete surface of FIG. 1 after a duration of two weeks and after an attempt was made to remove both coating compositions of FIG. 1 using a pressurized stream of water.

After two weeks, an attempt was made to remove the coatings using water forced through the nozzle of a high-pressure washer. The results were photographed and presented in FIG. 2. Evidently, the PRIOR ART solvent-based coating composition could not be removed using a pressurized water jet (left side) and would require sandblasting or mechanical scraping; whereas the hot melt coating composition of the invention (right side) was completely removed to reveal a rough concrete surface that was clean and suitable for any further coating or adhesive treatments desired.

EXAMPLE 6

A further exemplary hot melt coating composition of the invention can be formulated as follows, and it is believed that its coating performance and removability using a pressurized water jet would be similar to that of the coating described above in Example 5. The formulation was made by combining the following components: glycerolmonostearate (45%), glycerolmonooleate (10%), tri sodium citrate (8%), corn starch (25%), calcium carbonate (10%), and titanium dioxide (2%). This formulation had a melting point of approximately 45 degrees Celcius, and is believed to be spray-applicable using an electric spray maintained at 60 degrees C.

EXAMPLE 7

A further exemplary hot melt coating composition of the invention can be made using edible raw materials as follows: beef tallow (48%), coconut oil (12%), orange essential oil (3%), tri sodium citrate (10%), and corn starch (27%). It is believed that this formulation can be spray-applied at a temperature above 45 degrees Celcius, and will cool at ambient temperature (lower than 40 degrees C.) into a solid membrane suitable for use directly on the surface of mortar or concrete or in a form for molding a mortar or concrete.

The foregoing examples and embodiments are presented for illustrative purposes only and not intended to limit the scope of the invention.

The invention claimed is:

1. A method for set retarding the surface of a mortar or concrete, comprising:
   A. applying to the surface of a fresh mortar or concrete, or to the inner surface of a mold for forming the fresh mortar or concrete, a flowable or sprayable hot melt coating composition comprising at least one set retarder active suspended in a melted vegetable oil or derivative thereof, a melted animal oil or derivative thereof, or a melted mixture of said oils or derivatives thereof, heated to assume a flowable or sprayable form and, once cooled to ambient temperature after contact with the fresh mortar or concrete, being solidified into a membrane and removable from the mortar or concrete by use of pressurized water, said at least one set retarder active comprising a carboxylic acid or salt thereof, a sugar, or mixture thereof;

B. allowing said hot melt coating composition applied to said mortar or concrete surface to cool to ambient temperature whereby said hot melt coating composition forms a solidified membrane after the mortar or concrete in contact with the hot melt coating composition has been cooled to ambient temperature, said solidified membrane minimizing evaporation of moisture from the mortar or concrete; and C. thereafter removing said solidified membrane from the mortar or concrete using pressurized water thereby to expose a mortar or concrete surface roughened by said at least one set retarder active.

2. The method of claim 1 wherein the hot melt coating composition is spray-applied to the surface of a mortar or concrete and allowed to solidify at ambient temperature to form a membrane on the mortar or concrete surface, and thereafter the membrane is removed.

3. The method of claim 1 wherein the hot melt coating composition is spray-applied to the inner surfaces of a form for molding the mortar or concrete, and thereafter a fresh mortar or concrete is poured into the form.

4. The method of claim 3 wherein the mortar or concrete is demolded from the form, and thereafter the hot melt coating composition membrane is removed from the form, the mortar or concrete, or both.

5. The method of claim 2 wherein the hot melt coating composition comprises hydrogenated coconut oil, natural tartaric acid, titanium dioxide.

6. The method of claim 2 wherein the hot melt coating composition comprises hydrogenated coconut oil, myristic myristate, tri sodium citrate, and titanium dioxide.

7. The method of claim 1 wherein the hot melt coating composition comprises myristyl myristate, hydrogenated coconut oil, titanium dioxide, tri sodium citrate, calcium carbonate, and precipitated silica.

8. The method of claim 1 wherein the hot melt coating composition comprises vegetable triglycerides, titanium dioxide, tri sodium citrate, sucrose, calcium carbonate, precipitated silica, and iron oxide.

9. The method of claim 1 wherein the hot melt coating composition has a melting point of 35-55 degrees Celcius, and is spray-applied in liquid form onto the surface of the mortar or concrete or onto the inner surfaces of the mold at a temperature of 40-60 degrees Celcius and allowed to cool to below melting point temperature, whereby the hot melt coating composition forms a solidified membrane.

10. The method of claim 1 wherein the hot melt coating composition comprises a finely divided particulate material selected from calcium carbonate, sand, silicate sand, cement, talc, titanium dioxide, carbon black, slate dust, granite dust, clay, iron oxide, cobalt oxide, zinc oxide, silicon dioxide, mica, clay, barium sulfate, sodium silico-aluminate, alumina, barium carbonate, dolomite, or mixtures thereof.

11. The method of claim 1 wherein the hot melt coating composition comprises a finely divided particulate material selected from wood flour, cereal flour, gum, corn starch, wheat starch, rice starch, pea starch, carrageenan, alginate, or mixtures thereof.

12. The method of claim 1 wherein the hot melt coating composition comprises a finely divided particulate material selected from modified cellulose, gluten, hydroxyethyl cellulose, hydroxypropyl cellulose, carboxymethylcellulose, hydroxyethylcellulose, acetate modified starch, phosphate modified starch, hydroxypropyl modified starch, adipate modified starch, modified gums, and mixtures thereof.

* * * * *